Dec. 6, 1966  C. WYLE ETAL  3,289,453
APPARATUS FOR MANUFACTURING CONTAINER BODIES FROM BLANKS
Filed June 22, 1964  7 Sheets-Sheet 3

INVENTOR.
CHARLES WYLE
JOHN S. NAGY
BY
James E. Conny
ATTORNEY

Dec. 6, 1966 C. WYLE ETAL 3,289,453
APPARATUS FOR MANUFACTURING CONTAINER BODIES FROM BLANKS
Filed June 22, 1964 7 Sheets-Sheet 4

INVENTOR.
CHARLES WYLE
JOHN S. NAGY
BY
ATTORNEY

Dec. 6, 1966    C. WYLE ETAL    3,289,453
APPARATUS FOR MANUFACTURING CONTAINER BODIES FROM BLANKS
Filed June 22, 1964    7 Sheets-Sheet 5
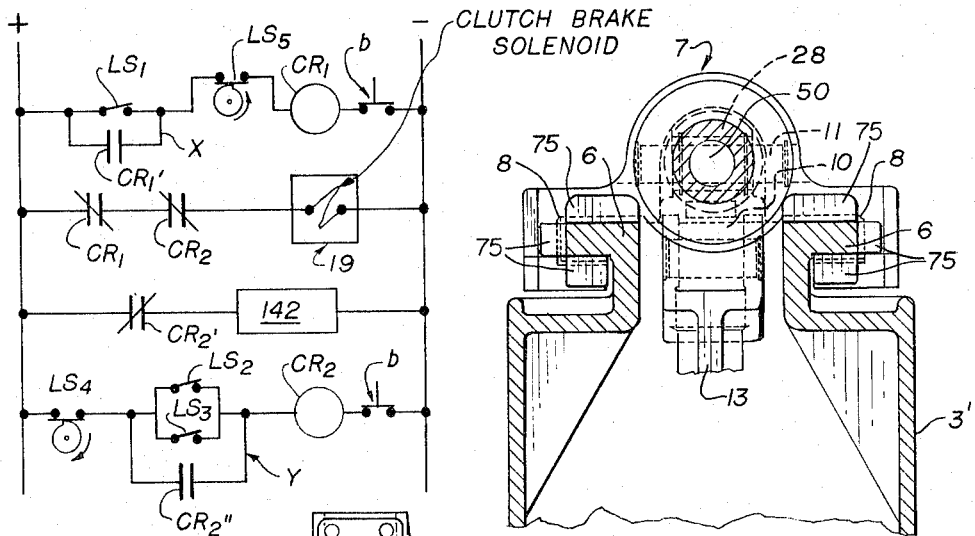
FIG. 13
FIG. 10
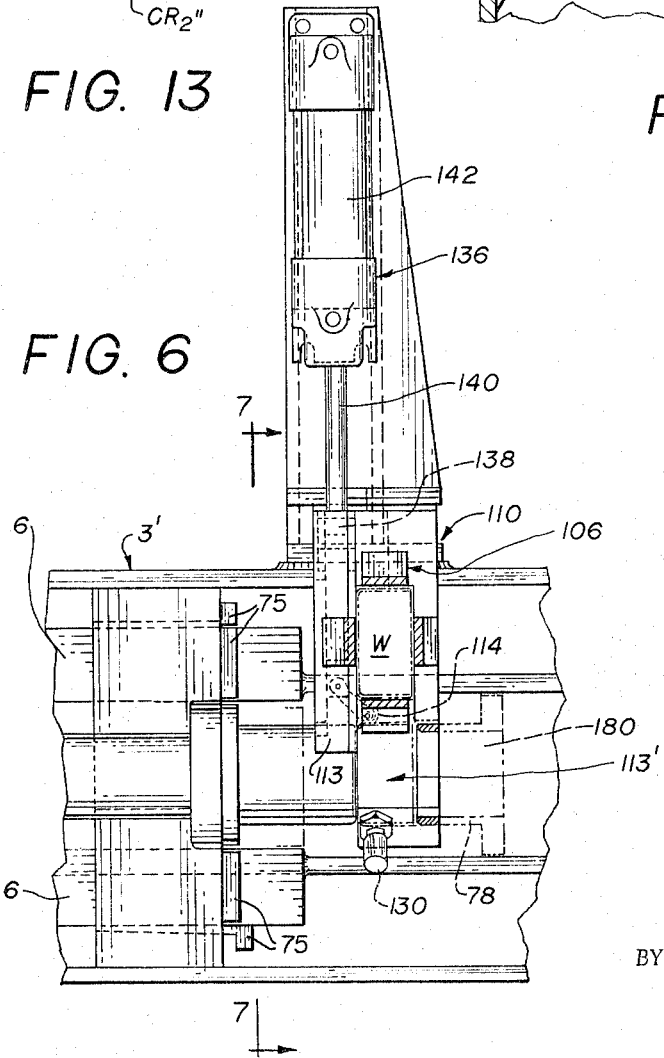
FIG. 6
INVENTOR.
CHARLES WYLE
JOHN S. NAGY
BY
*James E. Coney*
ATTORNEY INVENTOR.
CHARLES WYLE
JOHN S. NAGY
BY
James E. Toomey
ATTORNEY United States Patent Office 3,289,453
Patented Dec. 6, 1966

3,289,453
APPARATUS FOR MANUFACTURING
CONTAINER BODIES FROM BLANKS
Charles Wyle, Palo Alto, and John S. Nagy, Saratoga, Calif., assignors, by mesne assignments, to Kaiser Aluminum & Chemical Corporation, Oakland, Calif., a corporation of Delaware
Filed June 22, 1964, Ser. No. 376,719
16 Claims. (Cl. 72—349)

This invention relates to an apparatus for manufacturing containers. More particularly, it is concerned with providing an improved apparatus for manufacturing container bodies from blanks, such as shallow cup-shaped blanks or workpieces, wherein the cup-shaped blank is first oriented with and then passed in a single application of pressure through a series of aligned die orifices in such a fashion that the blank is reshaped and thereafter the wall of the cup-shaped blank is thinned and elongated to form a desired container body.

Accordingly, it is the primary purpose of this invention to provide an improved container-fabricating apparatus wherein improved means are employed for feeding and orienting preferably cup-shaped metal blanks with respect to a series of specially arranged and aligned die orifices, together with improved means for passing the blank in a single application of pressure through the die orifices so as to first reshape the blank or workpiece and then thin and elongate the wall of the workpiece to produce a container body of the desired size.

This and other purposes of the instant invention will become more apparent from a review of the following detailed description when taken in conjunction with the accompanying drawings which illustrate preferred embodiments of the invention and wherein;

FIG. 6 is a view taken generally along the line 6—6 of FIG. 5 with parts removed;

FIG. 10 is a view taken generally along the line 10—10 of FIG. 1 and with parts removed for the sake of clarity;

FIG. 13 is a schematic diagram of a suitable electrical control circuit that can be used for operating certain parts of the apparatus.

Although the apparatus will be described with reference to a single piece of equipment or a single machine, it is to be understood that individual pieces of equpment or machines can be arranged in batteries or in a group whereby they can all be operated from a common power source and that the apparatus or machine can be arranged in vertical and inclined planes, as well as in a horizontal plane, depending upon the results desired.

Figure 1:
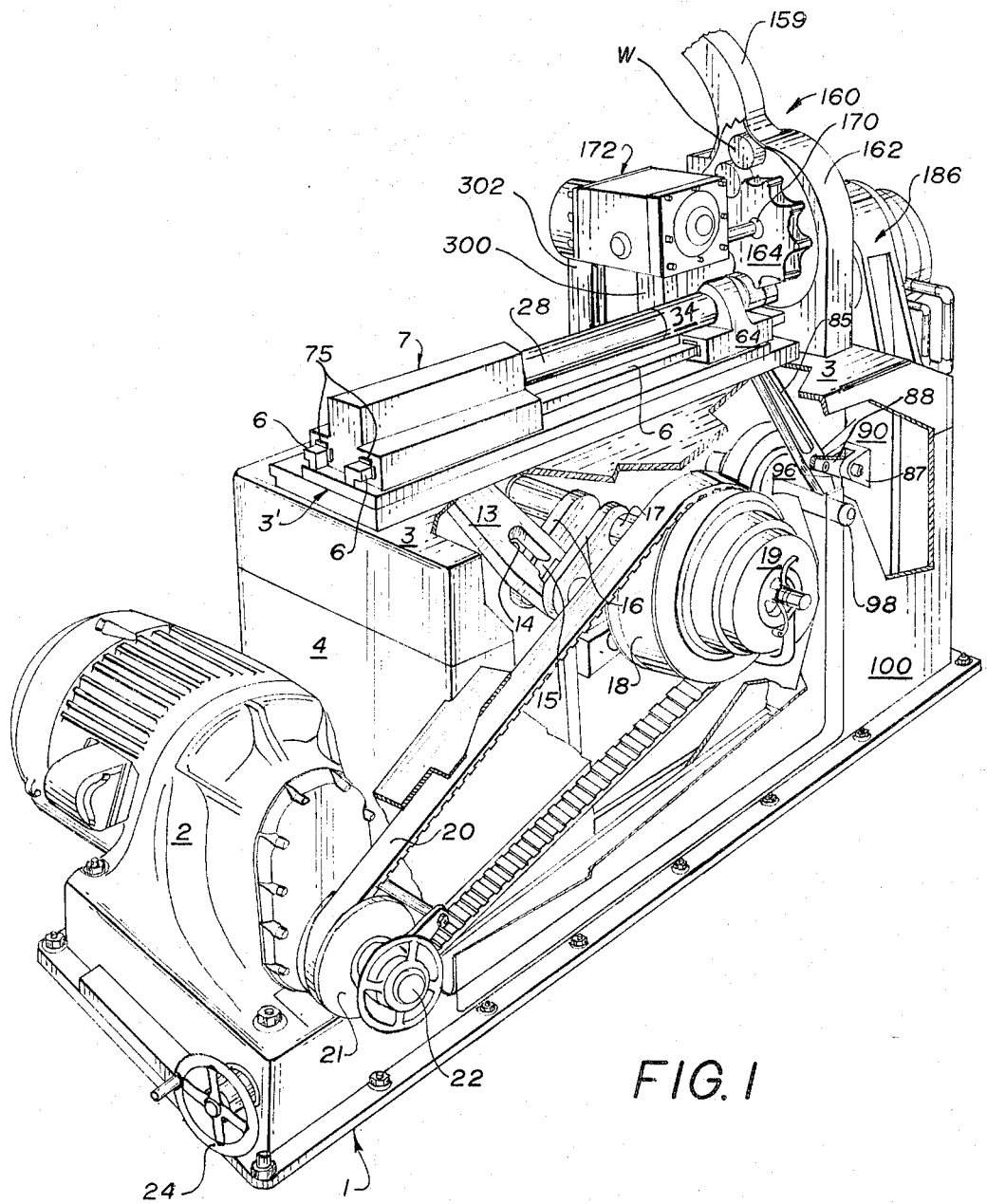
FIG. 1 is a broken perspective view of one embodiment of the improved apparatus of the instant invention.
Figure 2:
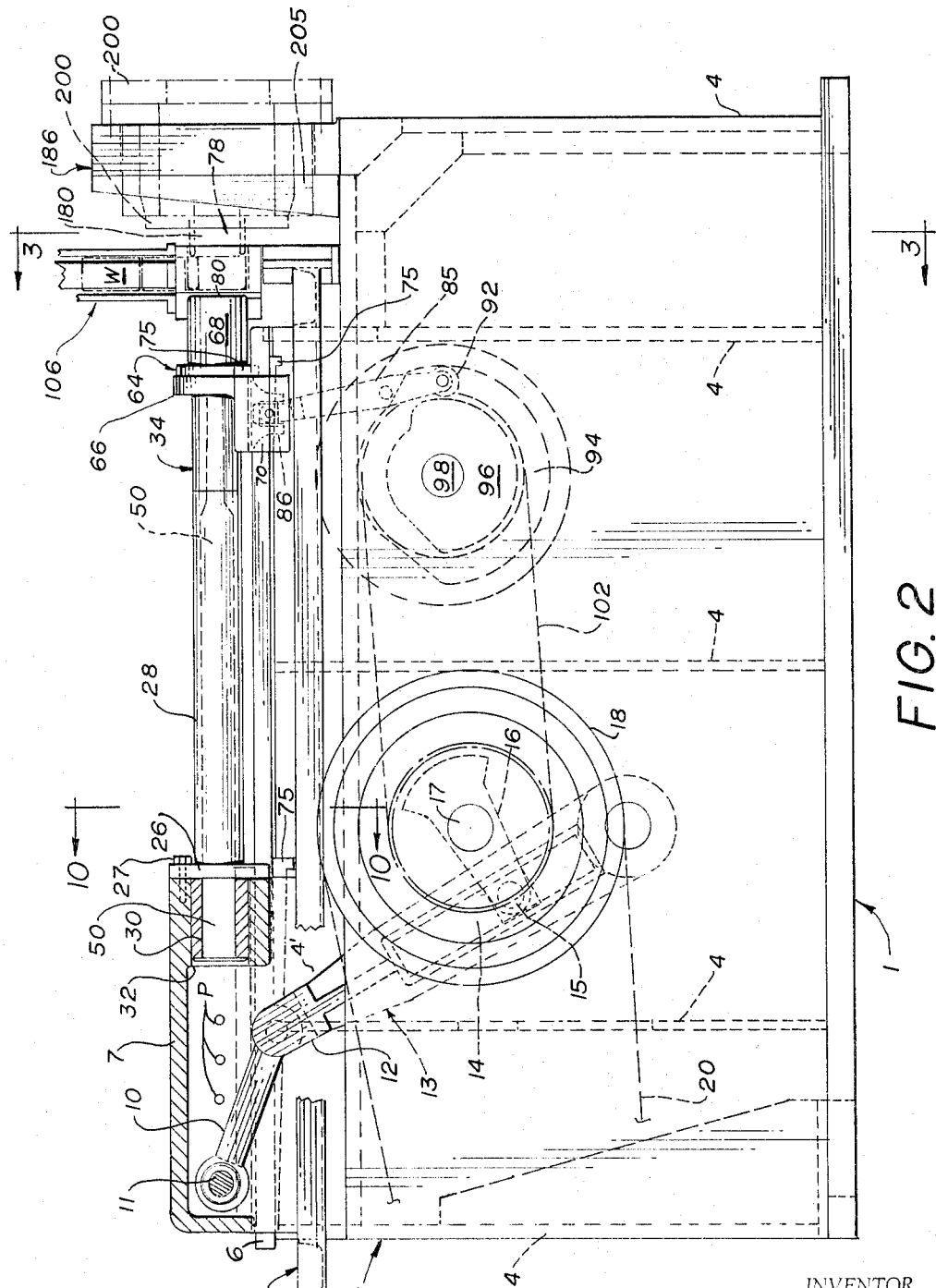
FIG. 2 is a side elevational view of the apparatus shown in FIG. 1 with certain parts thereof being shown in dotted lines, with other parts removed and with a modified form of cup feeding device being shown.
Figures 3, 4:
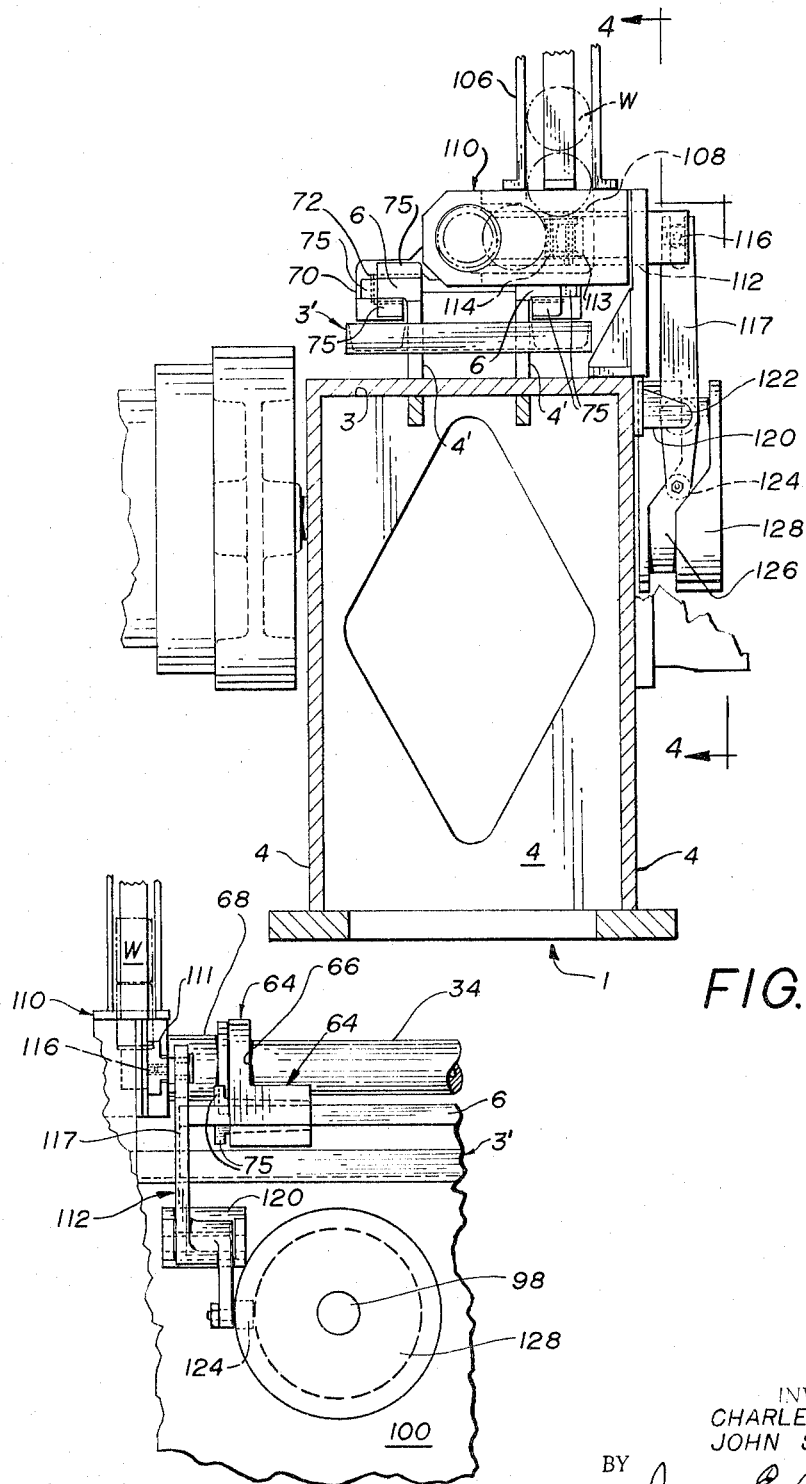
FIG. 3 is a sectional view of the apparatus shown in FIG. 2 when taken generally along the line 3—3 thereof.
FIG. 4 is a sectional view of a portion of the apparatus as shown in FIG. 3 when taken generally along the line 4—4 thereof.

With further reference to the drawings, and in particular FIGS. 1–3, the apparatus of the instant invention is generally comprised of a base support 1 mounted on the floor of the building housing the apparatus. Mounted in a conventional fashion upon the base support are a driving motor 2 and a primary elongated press bed or table 3. The table or press bed 3 is supported by the conventional legs or upstanding plates 4. Affixed to the top of the bed 3 by leg means 4' is a secondary elongated support 3'. Support 3' is constructed in such a fashion whereby it is provided with a pair of track elements 6 which extend for substantially the full length of the support 3' so as to serve as ways for the housing 7 slidably mounted thereon. Housing 7 generally has the configuration of an inverted T and it is provided, as indicated particularly in FIG. 10, with recesses or channels 8 within which the tracks or ways 6 are adapted to be inserted so that the housing 7 can be controllably moved along these tracks in a manner to be described more fully hereinafter.

Mounted within the hollow interior of housing 7 is a linkage element 10. This linkage element is pivotally connected at one end to the side walls of the housing 7 through the medium of a pivot pin 11. The opposing end of linkage element 10 is connected to the bifurcated end 12 of the lever arm 13. This lever arm is provided with an elongated slot 14 within which a pin means 15 is slidably disposed. Pin means 15 is connected to the crank arms 16 mounted on the crank shaft means 17. Shaft means 17 is suitably mounted in the apparatus in a manner conventional in the art. As indicated particularly in FIG. 1, this shaft means 17 carries a conventional pulley 18 and the shaft means can also be affixed to a conventional override clutch and braking mechanism generally indicated at 19. A pulley belt 20 is trained about pulley 18 as well as a pulley 21 connected to the shaft 22 driven by the motor 2. The housing for motor 2 is mounted upon the support or base 1 in a conventional manner whereby it can be moved on suitable slide elements (not shown) by the hand-operated adjusting wheel 24 to increase or decrease the speed of rotation of the crank shaft means in a manner conventional in the art. Thus, it will be observed that rotation of the motor will cause a rotation of the crank shaft 17 and a reciprocation of the housing 7 backwards and forwards along the ways 6 through the medium of a motor 2, pulleys 18 and 21, pulley belt 20, crank shaft means 17, crank arms 16, lever 13 and linkage element 10. The housing 7 is connected to the crank arms 16 in such a fashion that during 240° or the major portion of rotation of the crank arms 16 housing 7 is pushed forward at a relatively uniform velocity during the working stroke. The housing 7 is moved backward during 120° or a minor portion of rotation of the crank arms 16. Thus, the housing 7 and the ram 34 which is connected thereto move backward during the withdrawal stroke of the ram at about twice the speed or rate at which they move forward during the working stroke of the ram.

Suitably affixed to the housing 7, such as by means of the flange elements 26 and the bolts 27, is a piston rod 28, the enlarged portion 30 of which is disposed within the chamber section 32 of the housing 7. Affixed to the opposing end of the hollow piston rod 28 is a hollow forming punch or ram 34, the details of which are more clearly shown in FIG. 5. The ram 34 is securely affixed to the piston rod 28 by means of a hollow pin element 36 that can be formed integrally with rod 28. Pin element 36 is provided with an intermediate portion 38 of reduced cross section and an enlarged head end portion 40. Head end portion 40 contains a threaded recess 42 for receiving a bolt 44 provided with a bore 46. Bore 46 communicates with the bore 48 in the pin element 36 and the main bore 50 in the piston rod 28.

The forming ram is affixed to the pin element 36 of the piston rod 28 in the following fashion, reference being made particularly to FIG. 5. The bolt 44 has a head 52 which is adapted to rest in abutting relationship against the shoulder portion 54 of the hollow forming ram 34. When the bolt 44 is drawn up tightly, the bolt being turned by means of a suitable instrument inserted in openings (not shown) in the exposed face of the bolt head 52, the forming ram 34 will be abutted tightly against the shoulder 56 on the piston rod 28. In order to facilitate the disconnection or withdrawal of the forming ram 34 from the pin element 36, a suitable U-shaped anchoring clip or fitting 58 of spring steel, the details of which are not shown, is removably disposed adjacent the head 52 of the bolt 44 within a recess 60 in the ram. Thus, when the bolt 44 is turned in the proper direction, it will become loosened from the pin element 36 by virtue of the bolt head 52 bearing against the imbedded clip 58 so as to readily free the ram 34 from the pin element 36 of the piston rod 28.

Intercommunicating bores 46, 48 and 50 can be vented to the atmosphere in such a fashion, such as by openings or ports *p* in housing 7, whereby the interior of workpiece W which is affixed to the ram will also be in contact with the atmosphere so that a vacuum cannot be pulled upon the workpiece by the ram whereby the workpiece will not be released from the ram by a stripper mechanism at the end of the forming stroke of the ram and as the ram is withdrawn from the dies.

Figure 5:
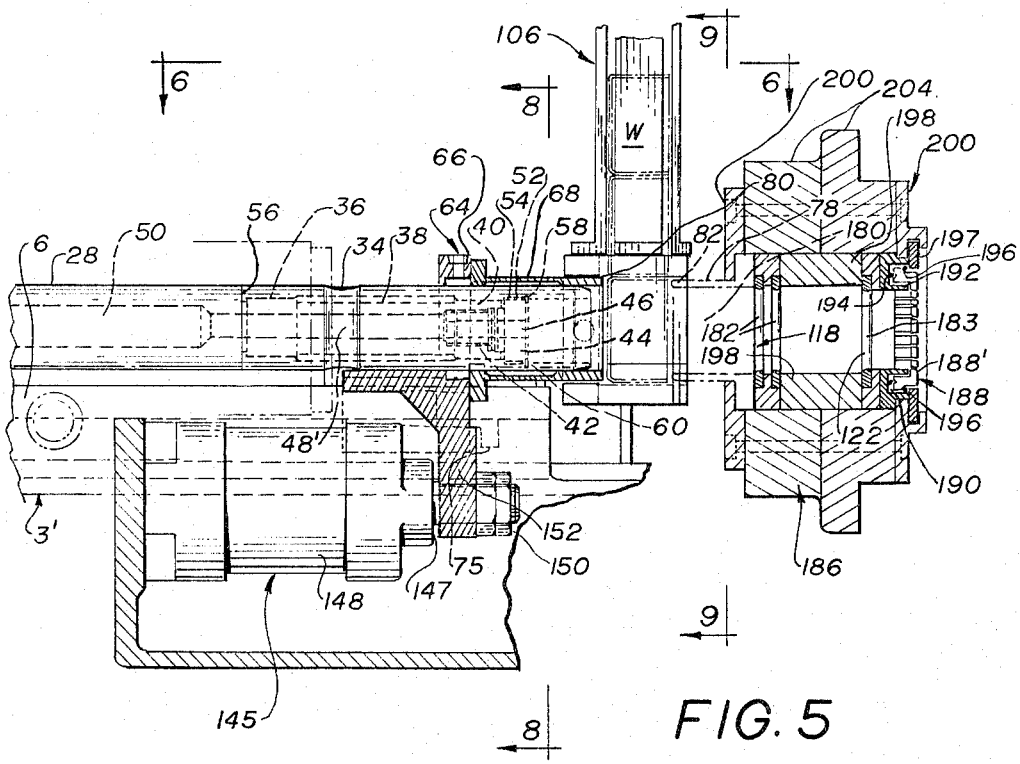
FIG. 5 is a fragmentary side elevational view of the forward portion of the apparatus shown in FIG. 2 with certain parts removed, with other parts being shown in section and with a modified form of forming ram guide sleeve being disclosed.
Figure 8:
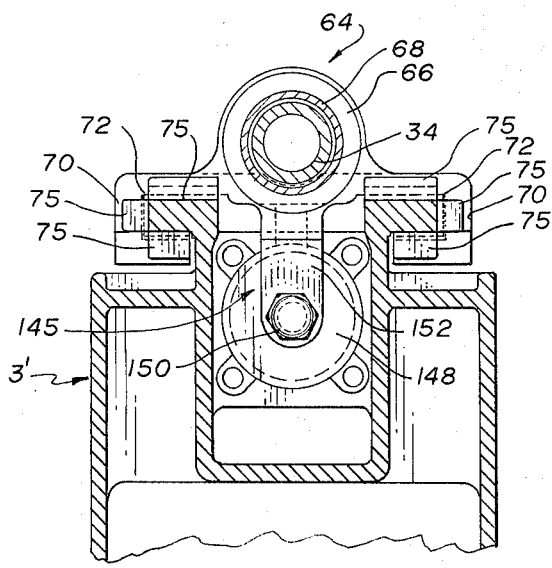
FIG. 8 is a cross-sectional view taken generally along the line 8—8 of FIG. 5 with parts removed.

In an advantageous embodiment of the invention, and as particularly indicated in FIGS. 2, 5 and 8, the ram 34 is concentrically disposed and supported within a reciprocating sleeve-like member 64. This sleeve-like member 64 is generally comprised of a ring-like section 66 and a barrel portion 68, which projects forwardly of the ring-like section 66 and surrounds or encompasses the forward portion of the ram. Sleeve member 64 is affixed to the ways 6 in the same general fashion as the housing 7 in that the sleeve member 64 is provided at the lower portion thereof with projecting flange elements or wings 70 similar in configuration to the wings of the housing 7. Wings 70 are provided with grooves 72 within which the rail members 6 fit at the time the sleeve member 64 is slidably disposed upon such rail members. As indicated particularly in FIGS. 2, 5, 8 and 10, suitable tapered and adjustable shim members 75 or other means such as preloaded linear roller bearings are located within the openings 72 on sleeve member 64 and openings 8 in slide member 7. These shim members are locked to the housing 7 or sleeve member 64, as the case may be, in a manner well known in the art. They serve to maintain the housing and sleeve member and, in turn, the ram and piston in a properly oriented and axially aligned position at all times with respect to the axes of the orifices of the several die members, and they are adjusted as needed to compensate for any wear in the various elements during operation of the device. Maintenance of the proper axial alignment between dies and ram during operation of the device is important for the successful functioning of the ram and dies. Inasmuch as the thickness of the cup-shaped blanks will, in most instances, be relatively small, even a slight offsetting of the ram axis with that of the several dies of the tool pack will result in improper forming of the container bodies. Even though the wall of the workpiece may not be fractured as a consequence of such offsetting the side wall of the blank will lack the uniform thickness desired.

Sleeve member 64 advantageously has a dual function. In the first place, it is used to support the ram and prevent a downward drooping and off-centering of the ram with respect to the dies, particularly at the time the ram is brought into contact with a cup-shaped blank or workpiece W and as the workpiece makes its initial entrance into the dies of the tool pack. The sleeve member 64 acts secondly as an anti-wrinkling device. That is to say, it is adapted to contact a cup-shaped workpiece W as the workpiece is advanced towards the dies by the feeding mechanism and thereafter to place it snugly upon the reverse draw die 78 slightly in advance of any contact of the workpiece by the ram. The forward end 80 of the barrel portion 68 which contacts the workpiece performs an advantageous workpiece guiding function after the workpiece has been advanced or slid over the nose portion 82 of the redraw die 78, the redraw die acting, among other things, as a centering device for aligning the workpiece W with all of the remaining dies making up the die means or tool pack. In performing this guiding function, the forward end 80 of barrel 68 lightly engages or wipes the blank W as the blank is turned inside out or back upon itself and the walls of the blank are caused by the ram to flow inside of the redraw die. In other words, as the blank is turned inside out and its cross-sectional dimension is changed, edge 80 acts as a wiping surface or guard for the bottom and wall of the blank and prevents the bottom and wall of the blank from flaring outwardly or otherwise being diverted away from the rounded surface of the bulbous nose portion 82 of the redraw die 78 as the blank is turned inside out and reduced in cross section in the redraw die by the action of the ram 34 as it advances the blank through the redraw die. Diversion of the blank bottom or side wall outwardly from the nose portion 82 of the redraw die as the material or metal of the blank is caused to flow across the surface of the nose portion can cause undesirable wrinkling or distortion of the metal in the bottom and side wall of the blank. Such a distortion or wrinkling would, among other things, inhibit the satisfactory desired elongation and thinning of the wall of the workpiece as it is thereafter presented to and advanced through the ironing dies 118 and 122 by the ram 34 during the continued forward stroke of the ram. For this reason, the very extreme forward movement of the sleeve member 64 during its reciprocation is such that it will always be spaced sufficiently away from the bulbous nose portion 82 of the redraw die 78 so that the end portion 80 of sleeve member 64 will act only to wipe the blank lightly and prevent diversion of the metal outwardly. It will thus be observed that sleeve member 64 performs a significant function in maintaining proper alignment of the ram with the dies and ensuring proper entrance of the workpiece into the dies.

The means for reciprocating the sleeve member in the desired fashion can, as indicated in FIG. 2, comprise a lever element 85 pivotally connected at one end to the lower portion of the sleeve member 64 by the pin means 86. An intermediate section of the lever arm 85 is pivotally connected to a linkage element 88 secured to the anchor brackets 87 mounted in a side wall 90 as shown in FIG. 1. The free end of arm 85 carries a roller 92 which rides in a cam groove or track 94 provided in the rotating cam 96. Cam 96 can, if desired, be mounted on a shaft 98 which is anchored in standards or bearings 100 on either side of the apparatus with the standards being affixed in a suitable fashion to the basic frame or support 1 of the machine. It is to be understood that the cam track 94 will be of such a configuration whereby the sleeve member 64 will, during its forward motion, move in concert with the ram but slightly in advance of the ram whereby it will engage the cup-shaped workpiece W slightly ahead of the ram and act to lightly touch or contact the workpiece during the time that the ram first makes its contact with the workpiece and then acts to force the workpiece through the redraw die 78. Thereafter, the sleeve member will be retracted away from the redraw die and restored to its original starting position as the ram completes its advancement through the dies 78, 118 and 122 until the container-forming operation is completed so that the sleeve member will be ready to perform its function again on the next forward stroke of the ram 34.

The means for driving cam 96 can comprise a pulley (not shown) also affixed to the shaft 98 and this pulley can be driven by a belt 102 which is trained about a suitable pulley (not shown) affixed to the crank shaft 17 for the crank arms 16.

Figure 7:
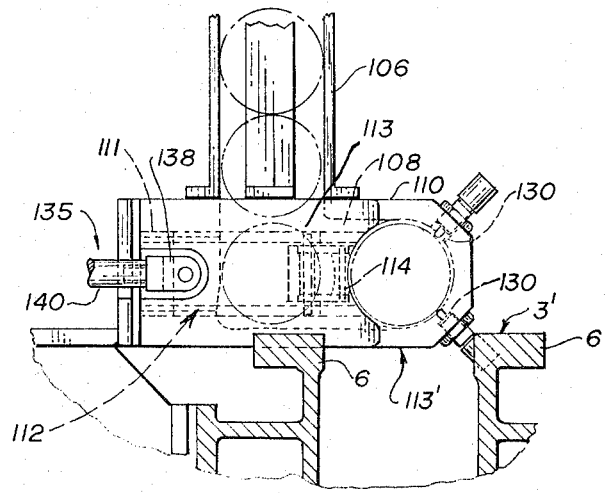
FIG. 7 is a view taken generally along the line 7—7 of FIG. 6 with parts removed for the sake of clarity.

In one advantageous embodiment of the invention, and as shown particularly in FIGS. 3 and 4, the cup-shaped blanks or workpieces W that are to be acted upon by the ram are fed to a position adjacent the nose 82 of the redraw die 78 and oriented both with respect to the redraw die 78 and the forming ram in the following fashion. Located adjacent and to one side of the redraw die 78 is a chute or magazine 106 for the cup-shaped workpieces W. The bottom of magazine 106 opens into a chamber 108 which is formed by the hollow interior of the box-like housing 110. A slide-type and reciprocating feeding device 112 is mounted in suitable trackways in chamber 108 and one end of this feeding device protrudes from the opening 111 in an end wall of housing 110. The forward portion 113 of the feeding device can be roughly C-shaped in cross section so that a suitably spring-biased roller element 114 can be pivotally attached to the C-shaped upper and lower arms of portion 113. As indicated in FIGS. 6 and 7, the forward end 113' of housing 110 can be cut away and curved inwardly so as to present no obstruction when the sleeve member 64 and ram 34 engage the blank W which has been removed from the magazine 106 by the roller element 114 and moved toward redraw die 78. The rearward portion of the slide feeder, as indicated particularly in FIGS. 3 and 4, can be linked by the pin means 116 to one extremity of a lever arm 117. The intermediate portion of lever arm 117 is pivotally secured to a bracket 120 affixed to one of the side plates 4 by means of the conventional pin element 122. The free extremity of the lever arm 117 carries a roller 124 which rides in the cam groove 126 of the cam 128, and 128 can be advantageously mounted upon the shaft 98 which also carries the cam 96 which controls the operation of the sleeve element 64. The cam 128 is of such a construction and rotates on the shaft 98 in a manner whereby it is properly synchronized, both with cam 96 which motivates the sleeve element 64 and the crank arms 16 used to motivate the housing 7, piston 28 and ram 34.

In this connection, it is to be observed, and as indicated particularly in FIGS. 6 and 7, that suitable stop members 130 are disposed within the chamber 108 whereby these stop members will locate and orient the cup-shaped workpiece W with respect to the ram as well as the die orifices of the redraw die 78 and ironing dies 118 and 122.

Figure 9:
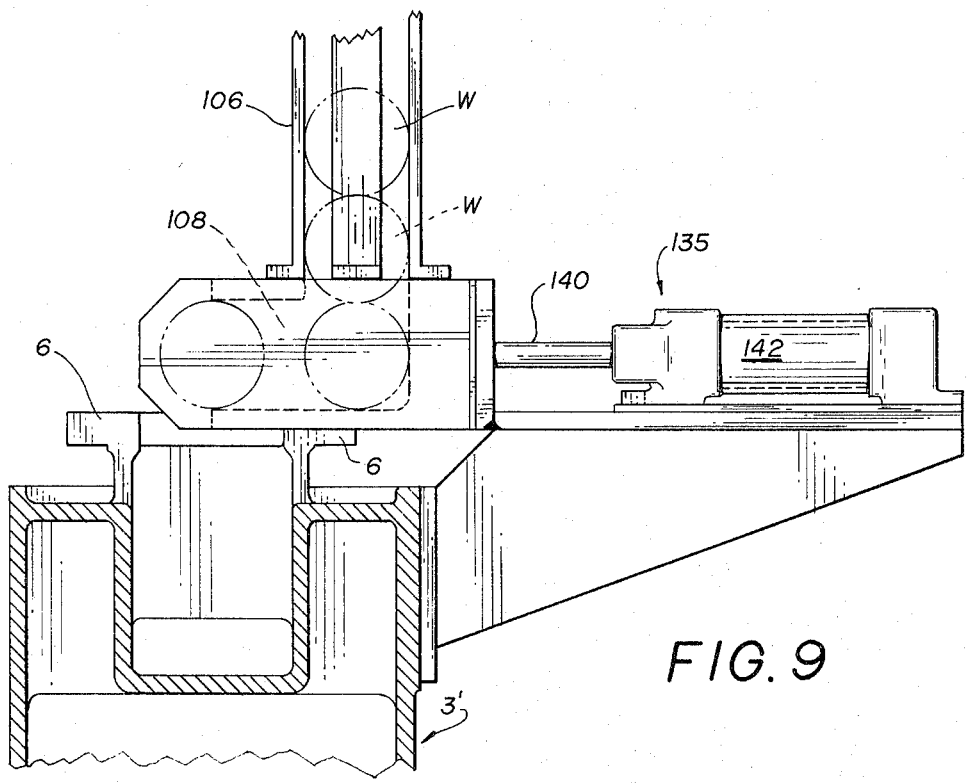
FIG. 9 is a view taken generally along the line 9—9 of FIG. 5 and with parts removed.

In a further advantageous embodiment of the invention, and as indicated particularly in FIGS. 6, 7 and 9, in lieu of a cam mechanism for operating the feeding device 112, a suitable piston and cylinder means 135 may be used. In this instance, the feeding device 112 would be connected by the pivot pin means 138 to the piston rod 140 secured to a piston located in the cylinder 142.

In another advantageous embodiment of the invention, and as indicated particularly in FIGS. 5 and 8, in lieu of the cam mechanism 96 and the associated lever and linkage elements 85 and 86 for controlling the operation of the sleeve mechanism 64, a suitable piston and cylinder arrangement 145 could be used. The cylinder 148 thereof can be suspended or secured to the support 3' of the apparatus and the piston rod 147 for the piston mounted within the cylinder 148 can be secured by the bolt means 150 to a depending arm 152 connected to the slide element 64, all in the manner indicated particularly in FIGS. 5 and 8.

Figures 11, 12:
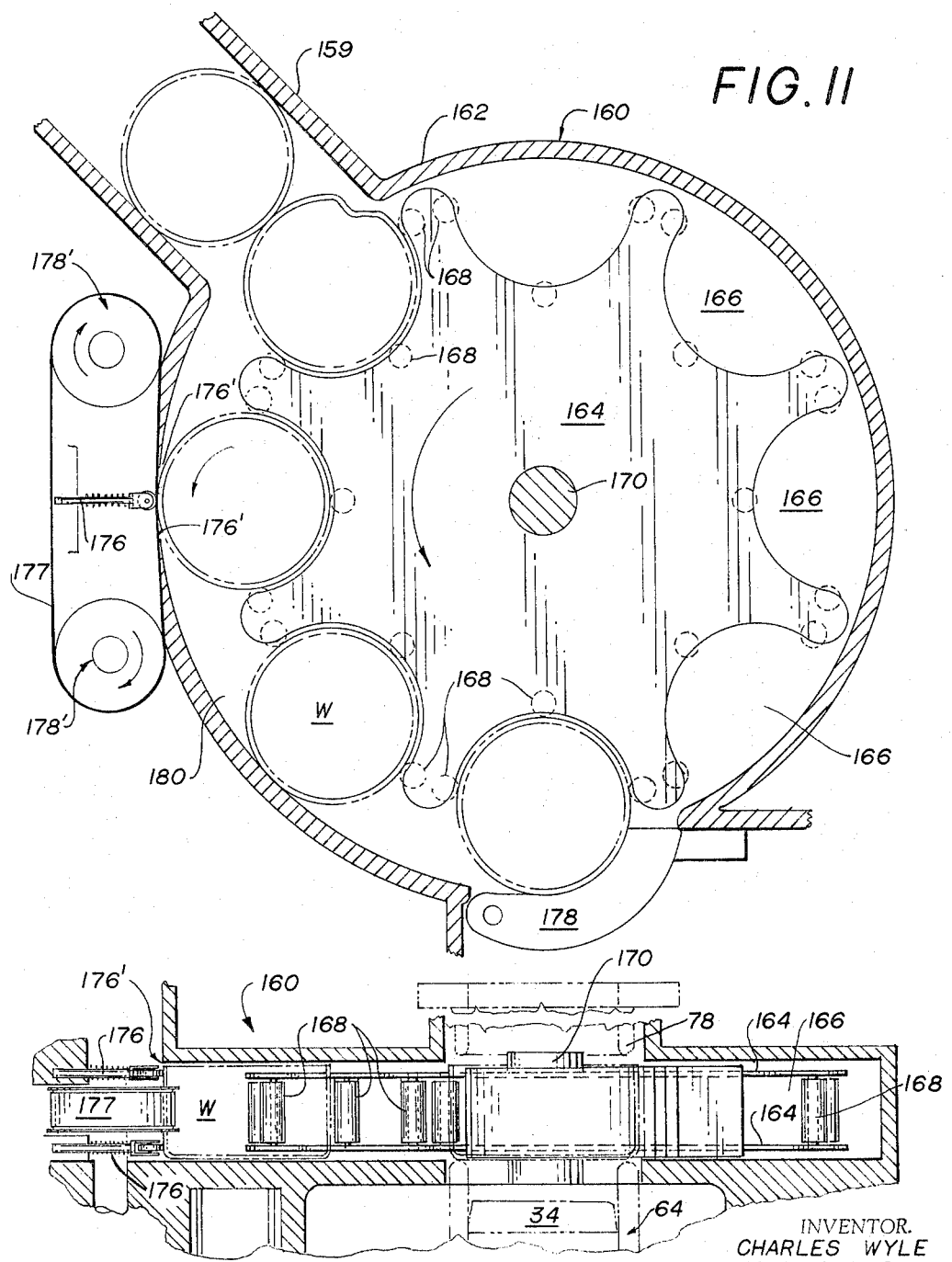
FIG. 11 is an elevational sectional view of the workpiece feeding device shown in FIG. 1 that can be used in feeding cup-shaped blanks to the apparatus.
FIG. 12 is a top plan and partially sectional view of the feeding device shown in FIG. 11.

In a further advantageous embodiment of the invention, and as indicated particularly in FIGS. 1, 11 and 12, in lieu of the slide-type feeding devices disclosed in FIGS. 3, 4, 6, 7 and 9, a rotating turret-type device could be employed. In this instance, it is contemplated that this turret-type device 160 could be mounted as indicated in FIG. 1 within a housing 162 on the platform or table 3 below the gravity-operated feeding magazine 159 and intermediate the redraw die 78, the ram 34 and sleeve device 64. This turret-type device comprises a pair of plates 164 which are so configured as to be provided with pocket elements 166. Plates 164 are secured together by suitable roller and pin means 168. These two plates 164 making up the turret-type device are, as indicated in FIGS. 1, 11 and 12, mounted on a spindle or shaft 170. The controlled intermittent rotation of shaft 170, which is required to synchronize the operation of turret device 160 with the movements of ram 34 and sleeve member 64, is obtained by use of a suitable indexing mechanism such as one sold by the Ferguson Machine Company, a division of Universal Match Corporation of St. Louis, Missouri, and known in the trade as a "Ferguson Indexing Drive." The indexing mechanism is located in the housing 172 which is supported from table 3 by the supports 300. This indexing mechanism is driven in a conventional fashion by a suitable chain drive or the like (not shown) and enclosed within the shield 302 by gears or the like which can be affixed to a rotating shaft that is driven by motor 2 such as shaft 98. It will thus be observed that this indexing mechanism provides the proper timing and indexing of the turret feed device such that the workpieces W will drop from magazine 159 into the pockets 166 and then be carried by the turret until they come to rest on a ledge element or holder 178 suitably located intermediate and below the nose 82 of redraw die 78 and the forward portions of ram 34 and sleeve 64. The workpiece W will remain in this position until it is picked up by the sleeve 64 and slid over the bulbous nose portion of the redraw die 78. The turret device, the operation of which is fully synchronized with the movements of the ram 34 and sleeve member 64 as indicated above, after discharging the workpiece, will remain stationary until the ram backs out of the dies and clears the turret device. As soon as the ram clears the turret device, the turret device will again rotate one pocket so as to discharge the succeeding workpiece just in time for the sleeve 64 and the ram 34 to advance and contact this workpiece. During the feeding operation the walls of housing 162 act as suitable guides for restraining and keeping the workpieces in the pockets 166 as they are fed to the ledge element 178.

If desired, a suitable workpiece sensing device can be incorporated in the above-described turret-type feeding apparatus for sensing defective workpieces being fed to the machine. This sensing device, as indicated in FIGS. 11 and 12, can include a series of spring biased roller elements 176 suitably disposed adjacent an opening 176' in the housing 162. These roller elements 176 are disposed on either side of an endless belt 177 and are adapted to contact the outer peripheral surface of each workpiece W. The belt 177 which is used to rotate the workpieces W within the pockets 166 is driven by one of the pulleys 178'. The sensing devices 176 upon sensing a defective blank act to control the circuit to the overriding clutch and braking mechanism 19 so as to stop rotation of the crank shaft 17 and the movement of the turret and the ram in the following manner.

As indicated in FIG. 13 the sensing devices 176 control the opening and closing of the normally closed switch $LS_1$ disposed in the line containing the relay $CR_1$. The sensing devices operate in such a fashion that they will keep switch $LS_1$ in an open condition as long as proper workpieces are being sensed. When relay $CR_1$ is energized it acts to open the normally closed contacts CR₁ in the line containing the common control solenoid for the brake and clutch elements of mechanism 19 whereupon the clutch element of mechanism 19 will effect a disengagement of shaft means 17 from pulley 18 while the brake element thereof acts to quickly stop further rotation of the shaft means 17 and further movements of the ram 34 and sleeve member 64. At the same time, the bypass or holding circuit X in the line containing relay CR₁ acts to maintain the relay CR₁ in an energized condition by virtue of the normally open contacts CR₁, in this holding circuit which are closed whenever relay CR₁ is energized. Thus relay CR₁ will still remain energized despite the opening of switch LS₁ after either sensing device 176 has passed over an irregularity or deformation in a workpiece W. As long as a proper workpiece is presented to both sensing devices 176, however, switch LS₁ will be held open. It will close only when a defective workpiece is sensed by either monitoring or sensing device 176.

Inasmuch as the sensing elements 176 need be operative only during the dwell cycle of the turret device 160, a cam operated switch LS₅ is also located in the line containing relay CR₁ whereby the relay CR₁ will be placed in an energizable condition only during the said dwell cycle. The cam for controlling switch LS₅ can be driven by suitable means from motor 2.

In a further advantageous embodiment of the invention and as indicated particularly in FIGS. 7 and 13 the stop elements 130 can advantageously take the form of micro switches which can be used to actuate the clutch-brake mechanism 19 for the purposes of stopping ram and sleeve member 64 in the manner noted above in the event the workpiece is not properly oriented by the slide type feeder mechanism 112 relative to the ram and dies. This is effected in the following fashion. Each stop element 130 is associated with and is adapted to open one of a pair of normally closed switches LS₂ and LS₃ arranged in parallel in the line leading to a relay CR₂. Energization of relay CR₂ causes the normally closed contacts CR₂ to open thereby deactivating or deenergizing the solenoid for the clutch-brake mechanism 19 whereby the rotation of shaft means 17 and further movements of the ram as well as those of the slide 112 feeder in the case of where the feeder is driven by the cam 128, will cease. In the event the slide feeder 112 is piston operated a second set of normally closed contacts CR₂′ also controlled by the relay CR₂ and located in the control circuit for the piston and cylinder assembly 142 will be opened by relay CR₂ thereby deenergizing the control circuit for this piston and cylinder assembly. The workpiece must engage both stop elements 130 simultaneously in order to keep both of switches LS₂ and LS₃ open and prevent relay CR₂ from being energized. This assures that relay CR₂ will be energized and perform its ram stopping function only when a defective cup is presented to the switches 130 or when the cup is improperly oriented relative to the ram and dies. A suitable holding or by-pass circuit y containing the normally open holding contacts CR₂″ which are closed on the energization of relay CR₂ is employed to maintain the relay CR₂ in an energized state.

Also located in the line leading to the relay CR₂ is a cam controlled normally closed limit switch LS₄. The cam controlling switch LS₄ is driven in a suitable fashion from motor 2 whereby switch LS₄ will be closed only during the short time required for monitoring the workpiece as it is being properly oriented relative to the ram and dies by the slide feeder 112 and just before it is engaged by sleeve element 64.

In order to reset the various circuits above described, suitable reset buttons b may be employed. Finally suitable audible or visual alarms (not shown) may be incorporated in the above circuit, when stoppage of the ram 34 and sleeve member 64 occurs so that the operator may completely shut down the machine and remove the defective workpiece.

After the ram picks up the cup-shaped blank W which has previously been placed over the bulbous nose portion 82 of the redraw die 78, it forces the blank to be turned inside out or back upon itself as it passes through the orifice 180 of the redraw die. At the same time, the workpiece will undergo a change in its cross-sectional dimension. As the ram continues to advance through the tooling under the urging of the piston rod 28, it will cause the reshaped blank to pass through the progressively reduced in cross-section and aligned orifices 182 and 183 of the ironing dies 118 and 122 at which time the side wall of the blank will undergo the desired thinning and elongation.

The ironing dies, as well as the redraw die 78, are disposed within the housing 186 mounted on table 3 along with a suitable stripper mechanism 188 comprised of a plurality of finger elements 188′ located in recess 190 in the holder 192. These finger elements are held in the proper position by means of the compressible circular gasket elements 194 and 196 and keeper ring 197. The entire tool pack assembly comprising the stripper mechanism 188, keeper ring 197, ironing dies 118 and 122, die spacers 198 and redraw die 78 are all retained in housing 186 by means of the clamping plates 200. Plates 200 are provided with suitable bores through which anchor bolts can be inserted, as well as through similar bores in the housing body elements 204 which are suitably mounted on the press bed 3 by means of brackets 205.

Advantageous embodiments of the invention have been herein shown and described. It is obvious that various changes and modifications may be made therein without departing from the spirit and scope thereof, as defined in the appended claims, wherein;

What is claimed is:

1. In a workpiece forming apparatus the combination of a die means including a reverse draw die and at least one ironing die aligned with said reverse draw die, a forming ram means moveable into and out of said dies and operable to force a cup-shaped workpiece successively through said reverse draw die and ironing die during the forward stroke of the forming ram means, means connected to said ram means for motivating said ram means during its forward and return strokes, and common means both for supporting said ram means and initially advancing said workpiece towards said reverse draw die prior to engagement of the workpiece by said forming ram.

2. In an apparatus as set forth in claim 1, wherein said reverse draw die is provided with a nose portion and said common means is provided with workpiece guide means and wherein said common means acts to slide said workpiece over said nose portion and means for operating said common means independently of said ram means and in such a fashion as to hold said common means adjacent said nose portion of said reverse die during the advance of said ram means through the reverse draw die whereby the material of the workpiece will be guided about the nose portion of the reverse draw die as it is forced through the reverse draw die by the ram means.

3. In an apparatus as set forth in claim 1, wherein said common means comprises a sleeve member concentrically and slidably disposed about and in supporting engagement with the said ram means and means for advancing said sleeve member toward and moving said sleeve member away from the reverse draw die independently of the ram means whereby the leading edge of the sleeve member during its movement toward the reverse draw die can engage and orient the workpiece relative to said reverse draw die slightly in advance of the time the ram means contacts the workpiece.

4. In an apparatus as set forth in claim 3, wherein the means for advancing said sleeve member toward and moving said sleeve member away from said reverse draw die includes a cam and lever means.

5. In an apparatus as set forth in claim 3, wherein the means for advancing said sleeve member toward and moving said sleeve member away from said reverse draw die includes a piston and cylinder means.

6. In an apparatus as set forth in claim 1, including a workpiece feeding means for advancing a workpiece toward said common means, said workpiece feeding means comprising a rotatable turret element provided with pockets for receiving the cup-shaped workpiece and for moving said workpiece into a position adjacent the entry end of the reverse draw die and said common means and means for synchronizing the movements of the turret element with the movements of said ram means.

7. An apparatus as set forth in claim 1, including a feeder means for disposing a cup-shaped workpiece adjacent the entry end of the reverse draw die and said common means.

8. An apparatus as set forth in claim 1 wherein said ram means motivating means includes a cam and lever means.

9. An apparatus as set forth in claim 1 including means for deactivating said ram means and common means upon the presentation of a defective workpiece to said ram means and common means.

10. In a workpiece forming apparatus of the type described the combination of a die means including a reverse draw die and at least one ironing die aligned axially with said reverse draw die, a forming ram aligned with said reverse draw die and said ironing die and operable to force a cup-shaped workpiece successively through said reverse draw die and ironing die during the forward stroke thereof, said reverse draw die being provided with nose means at the entry end thereof for receiving a cup-shaped workpiece and for orienting and centering said workpiece with respect to said reverse draw die as well as said ironing die upon the forward and rearward strokes of the ram, cam and lever means connected to the ram for motivating said ram during its forward and return strokes in such a fashion that the ram will move at a faster rate during its return stroke than during its forward stroke while moving the ram at a relatively uniform velocity during its forward stroke and workpiece guide means associated with the ram and reverse draw die for engaging and sliding said workpiece about the nose means of said reverse draw die prior to engagement of the workpiece by said forming ram.

11. In an apparatus as set forth in claim 10, including means for operating said workpiece guide means independently of said ram and in such a fashion as to hold said workpiece guide means adjacent said nose means during the advance of said ram through the reverse draw die whereby said guide means can direct the workpiece about the nose means of the reverse draw die as the workpiece is forced through the reverse draw die by said ram.

12. In an apparatus as set forth in claim 10, wherein said workpiece guide means comprises a sleeve member concentrically and slidably disposed about and in supporting engagement with said ram.

13. In an apparatus as set forth in claim 11, wherein said means for operating said workpiece guide means includes a cam and lever means.

14. In an apparatus as set forth in claim 11, wherein said means for operating said workpiece guide means includes a piston and cylinder means.

15. In an apparatus as set forth in claim 10, including a reciprocating slide-type feeder for engaging a cup-shaped workpiece and advancing the workpiece to a position intermediate the nose means of the reverse draw die and said workpiece guide means and means for synchronizing the movements of the feeder with the movements of the ram and workpiece guide means.

16. In an apparatus as set forth in claim 10, including a rotatable turret element provided with pockets for receiving the cup-shaped workpiece and then advancing said workpiece into a position intermediate the nose means of the reverse draw die and said workpiece guide means and means for synchronizing the movements of the turret element with the movements of the ram and the workpiece guide means.

References Cited by the Examiner

UNITED STATES PATENTS

| | | | |
|---|---|---|---|
| 1,942,930 | 1/1934 | Ludington | 113—120 |
| 1,987,101 | 1/1935 | Fabrice | 113—120 |
| 2,337,182 | 12/1943 | Calleson et al. | 113—120 |
| 2,761,406 | 9/1956 | Schnell | 72—349 |
| 3,167,044 | 1/1965 | Henrickson | 113—120 |

CHARLES W. LANHAM, *Primary Examiner.*

UNITED STATES PATENT OFFICE
CERTIFICATE OF CORRECTION

Patent No. 3,289,453 December 6, 1966

Charles Wyle et al.

It is hereby certified that error appears in the above numbered patent requiring correction and that the said Letters Patent should read as corrected below.

Column 4, line 41, after "workpiece" insert -- W --; column 5, line 44, for "128", second occurrence, read -- cam 128 --; column 8, line 57, for "reverse die" read -- reverse draw die --.

Signed and sealed this 25th day of June 1968.

(SEAL)
Attest:

Edward M. Fletcher, Jr.
Attesting Officer

EDWARD J. BRENNER
Commissioner of Patents